US012505684B2

(12) United States Patent
Kim et al.

(10) Patent No.: US 12,505,684 B2
(45) Date of Patent: Dec. 23, 2025

(54) METHOD OF PREDICTING FINE DUST CONCENTRATION AND INFERRING SOURCE BY USING LOCAL PUBLIC DATA AND PREDICTION AND INFERENCE DEVICE

(71) Applicant: ELECTRONICS AND TELECOMMUNICATIONS RESEARCH INSTITUTE, Daejeon (KR)

(72) Inventors: Hyun Jong Kim, Chungcheongbuk-do (KR); Tae-Gyu Kang, Busan (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 456 days.

(21) Appl. No.: 18/113,764

(22) Filed: Feb. 24, 2023

(65) Prior Publication Data

US 2024/0029457 A1 Jan. 25, 2024

(30) Foreign Application Priority Data

Jul. 19, 2022 (KR) ........................ 10-2022-0088711

(51) Int. Cl.
*G06V 20/00* (2022.01)
*G01N 15/06* (2006.01)
(Continued)

(52) U.S. Cl.
CPC ........... *G06V 20/698* (2022.01); *G01N 15/06* (2013.01); *G06N 3/044* (2023.01); *G06N 3/0464* (2023.01)

(58) Field of Classification Search
CPC .. G06V 20/698; G01N 15/06; G01N 15/0227; G01N 15/075; G01N 15/1429;
(Continued)

(56) References Cited

U.S. PATENT DOCUMENTS

2016/0125307 A1* 5/2016 Zheng ...................... G06N 3/08 706/20
2019/0163847 A1 5/2019 Oh et al.
(Continued)

FOREIGN PATENT DOCUMENTS

KR 10-2042165 B1 11/2019
KR 10-2020-0052401 A 5/2020
(Continued)

*Primary Examiner* — Neil R Mclean
(74) *Attorney, Agent, or Firm* — LRK PATENT LAW FIRM

(57) ABSTRACT

Disclosed are a method of predicting a fine dust concentration and inferring a fine dust source by using local public data and a prediction and inference device. The method of predicting a fine dust concentration and inferring a fine dust source by using local public data includes generating time-series data related to fine dust by collecting public data in a specific region in a predetermined chronological order and determining whether fine dust is generated in the specific region by converting pieces of time-series data collected in consecutive times into an image dataset for training and by training the image dataset for training in a convolution neural network (CNN)-based image classification model.

9 Claims, 12 Drawing Sheets

(51) Int. Cl.
*G06N 3/044* (2023.01)
*G06N 3/0464* (2023.01)
*G06V 20/69* (2022.01)

(58) Field of Classification Search
CPC ....... G01N 15/1433; G01N 2015/0046; G01N 2015/0096; G06N 3/044; G06N 3/0464; G06N 3/09; G06N 3/045; G06N 3/0442; G06N 3/049; G06N 3/08; G06N 5/04; G06Q 50/26; G06Q 50/10; G08B 21/12; G08B 31/00
USPC .......................................................... 382/159
See application file for complete search history.

(56) References Cited

U.S. PATENT DOCUMENTS

| | | | | |
|---|---|---|---|---|
| 2020/0160101 | A1 | 5/2020 | Kim et al. | |
| 2021/0356158 | A1* | 11/2021 | Kwon | ....................... F24F 8/10 |

FOREIGN PATENT DOCUMENTS

| | | | | | |
|---|---|---|---|---|---|
| KR | 10-2020-0128226 | A | | 11/2020 | |
| KR | 20200128226 | A | * | 11/2020 | ............. G08B 31/00 |
| KR | 10-2021-0010184 | A | | 1/2021 | |
| KR | 10-2325137 | B1 | | 11/2021 | |
| KR | 10-2328762 | B1 | | 11/2021 | |

* cited by examiner

| | Date and time | so2 | co | o3 | no2 | pm10 | pm25 |
|---|---|---|---|---|---|---|---|
| | 2020030101 | 0.004 | 0.4 | 0.031 | 0.009 | 23 | 8 |
| | 2020030102 | 0.005 | 0.4 | 0.032 | 0.008 | 25 | 10 |
| | 2020030103 | 0.006 | 0.4 | 0.032 | 0.008 | 19 | 11 |
| | 2020030104 | 0.007 | 0.4 | 0.033 | 0.007 | 22 | 9 |
| | 2020030105 | 0.006 | 0.4 | 0.033 | 0.007 | 24 | 10 |
| Now | 2020030106 | 0.006 | 0.4 | 0.032 | 0.008 | 21 | 11 |
| | 2020030107 | 0.006 | 0.4 | 0.033 | 0.008 | 21 | 9 |
| | 2020030108 | 0.005 | 0.4 | 0.026 | 0.013 | 19 | 11 |
| After 3 hours | 2020030109 | 0.004 | 0.4 | 0.022 | 0.017 | 21 | 13 |
| | 2020030110 | 0.004 | 0.4 | 0.03 | 0.012 | 24 | 14 |

Time-series data by fine dust features

| Dust concentration (㎍/m$^3$, daily mean) | Good | Normal | Bad | Very bad |
|---|---|---|---|---|
| $PM_{10}$ | 0~30 | 31~80 | 81~150 | Greater than or equal to 151 |
| $PM_{25}$ | 0~15 | 16~35 | 36~75 | Greater than or equal to 76 |

Fine dust concentration grade

| Dust concentration (μg/m³) | Good | Normal | Bad | Very bad |
|---|---|---|---|---|
| PM10 | 0~30 | 31~80 | 81~150 | ≥ 150 |
| PM2.5 | 0~15 | 16~35 | 36~75 | ≥ 76 |
| Weight | -w | 0 | +w | +2w |

Weight by fine dust (PM 10, PM 2.5) concentration grades

Concentration correction by predicted fine dust grades

METHOD OF PREDICTING FINE DUST CONCENTRATION AND INFERRING SOURCE BY USING LOCAL PUBLIC DATA AND PREDICTION AND INFERENCE DEVICE

CROSS-REFERENCE TO RELATED APPLICATION(S)

This application claims the priority benefit of Korean Patent Application No. 10-2022-0088711 filed on Jul. 19, 2022, in the Korean Intellectual Property Office, the disclosure of which is incorporated herein by reference for all purposes.

BACKGROUND

1. Field of the Invention

One or more embodiments relate to a method of predicting fine dust and inferring a fine dust source and a prediction and inference device by using local public data to determine whether fine dust is generated by each region, predict the fine dust concentration, and infer a source of the high-concentration fine dust.

2. Description of Related Art

Related prior arts include Korean registration No. 10-2328762 (Artificial Intelligence-based Fine Dust Prediction Method and Device for Implementing the Method) and Korean registration No. 10-2325137 (Device and Method of Generating Hybrid Deep Learning Model to Improve Fine Dust Prediction Accuracy).

Recently, a high-concentration fine dust has been frequently generated because of various sources of fine dust by regions and nations.

Particulate matter (PM) 10 and ultrafine particles PM 2.5 are classified into carcinogens and may also be a cause of industrial damage, such as product defects and machine malfunctions.

Although observation stations have been installed and have operated to measure fine dust concentrations by regions in real time, the observation stations are no more than simply monitoring the fine dust concentrations.

Therefore, there is an urgent demand for new techniques for predicting a fine dust concentration with high accuracy, determining whether high-concentration fine dust is generated, inferring a fine dust source, and the like, through the development of a prediction system for recognizing whether high-concentration fine dust is generated and taking a preemptive measure.

The above description is information the inventor(s) acquired during the course of conceiving the present disclosure, or already possessed at the time, and is not necessarily art publicly known before the present application was filed.

SUMMARY

An aspect provides a method of predicting a fine dust concentration and inferring a fine dust source by using local public data and a prediction and inference device to increase the prediction accuracy of a fine dust concentration by converging a convolution neural network (CNN)-based training result of image classification of fine dust generation situations and a recurrent neural network (RNN)-based training result of fine dust concentration prediction.

Another aspect also provides policy officers with a guideline to preemptively implement an emergency high-concentration fine dust reduction measure by inferring a fine dust source from a training result of image classification of fine dust generation situations such that an emergency reduction policy measure may be efficiently implemented.

However, technical aspects are not limited to the foregoing aspect, and there may be other technical aspects.

According to an aspect, there is provided a method of predicting a fine dust concentration and inferring a fine dust source by using local public data including generating time-series data related to fine dust by collecting public data in a specific region in a predetermined chronological order and determining whether fine dust is generated in the specific region by converting pieces of time-series data collected in consecutive times into an image dataset for training and by training the image dataset for training in a CNN-based image classification model.

The method may further include, based on the determining of whether fine dust is generated in the specific region, inferring a fine dust generation grade of the generated fine dust, and correcting the inferred fine dust generation grade through a training result of an RNN model.

The method may further include inferring a source of the fine dust by applying class activation mapping (CAM) to the inferred fine dust generation grade and visually displaying the source of the fine dust on a map.

The method may further include predicting a fine dust concentration in the specific region by using the inferred fine dust generation grade and numerically displaying the predicted fine dust concentration.

The method may further include maintaining a standard deviation between fine dust concentrations such that the standard deviation does not decrease even when a prediction time increases by using the fine dust generation grade without using a root mean square error (RMSE) loss function when predicting the fine dust concentration and by applying a weight to the predicted fine dust concentration.

In addition, according to another aspect, there is provided a prediction and inference device by using local public data including an interface configured to generate time-series data related to fine dust by collecting public data in a specific region in a predetermined chronological order and a processor configured to determine whether fine dust is generated in the specific region by converting pieces of time-series data collected in consecutive times into an image dataset for training and by training the image dataset for training in a CNN-based image classification model.

Based on the determining of whether fine dust is generated in the specific region, the processor may infer a fine dust generation grade of the generated fine dust and correct the inferred fine dust generation grade through a training result of an RNN model.

The processor may infer a source of the fine dust by applying CAM to the inferred fine dust generation grade and visually display the source of the fine dust on a map.

The processor may predict a fine dust concentration in the specific region by using the inferred fine dust generation grade and numerically display the predicted fine dust concentration.

The processor may maintain a standard deviation between fine dust concentrations such that the standard deviation does not decrease even when a prediction time increases by using the fine dust generation grade without using an RMSE loss function when predicting the fine dust concentration and by applying a weight to the predicted fine dust concentration.

According to an embodiment of the present disclosure, a method of predicting a fine dust concentration and inferring a fine dust source by using local public data and a prediction and inference device may be provided to increase the prediction accuracy of a fine dust concentration by converging a CNN-based training result of image classification of fine dust generation situations and an RNN-based training result of fine dust concentration prediction.

In addition, according to the present disclosure, a guideline to preemptively implement an emergency high-concentration fine dust reduction measure by inferring a fine dust source from a training result of image classification of fine dust generation situations may be provided to policy officers such that an emergency reduction policy measure may be efficiently implemented.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
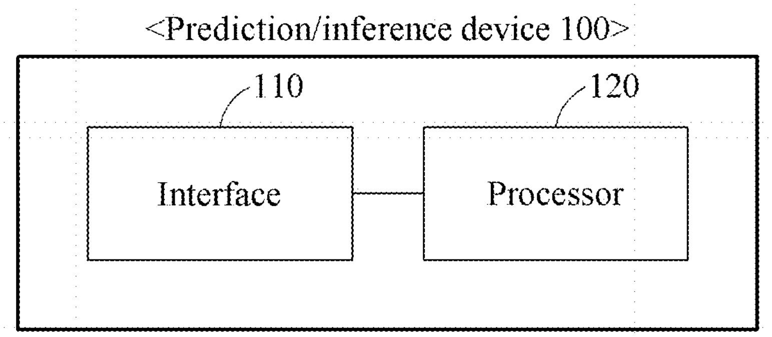
FIG. 1 is a block diagram illustrating a configuration of a prediction and inference device using local public data, according to an embodiment.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Hereinafter, the examples are described in detail with reference to the accompanying drawings. When describing the examples with reference to the accompanying drawings, like reference numerals refer to like elements and a repeated description related thereto will be omitted.

FIG. 1 is a block diagram illustrating a configuration of a prediction and inference device using local public data, according to an embodiment.

Referring to FIG. 1, according to an embodiment of the present disclosure, the prediction and inference device using local public data (hereinafter referred to as a 'prediction and inference device 100') may include an interface 110 and a processor 120.

First, the interface 110 may generate time-series data related to fine dust by collecting public data in a specific region in a predetermined chronological order. In other words, the interface 110 may generate consecutive pieces of time-series data by retrieving public data sensed in a time unit (e.g., an interval of 1 second, 10 minutes, or 1 hour), for example, by a sensor in a specific region, that is, an observation target with respect to fine dust generation.

In this case, the public data may be data, such as an aerial image capturing the specific region, and temperature, ozone, dust, air quality, etc. in the specific region that is sensed for a purpose of public interest and disclosed to the public through an open application program interface (API) of a public data portal.

The processor 120 may convert pieces of time-series data collected in consecutive times into an image dataset for training. In other words, the processor 120 may convert time-series data related to fine dust collected for a certain time into an image dataset and enable the image dataset to be trained in a convolution neural network (CNN), that is, a training model.

For example, the processor 120 may convert three pieces of ozone level data collected in 1-minute intervals in a region A into three image datasets by combining the three pieces of ozone level data with map data of the region A.

In addition, the processor 120 may determine whether fine dust is generated in the specific region by training the image dataset for training in a CNN-based image classification model. In other words, the processor 120 may determine whether fine dust is generated in the specific region by inputting a converted image dataset to the CNN and performing deep learning.

The CNN may be an algorithm useful for finding a pattern for analyzing an image dataset, that is, a neural network for directly learning the image dataset and classifying the image dataset by using the pattern.

Based on the determining of whether fine dust is generated in the specific region, the processor 120 may infer a fine dust generation grade of the generated fine dust and correct the inferred fine dust generation grade through a training result of a recurrent neural network (RNN) model. In other words, the processor 120 may verify that the fine dust is generated in a specific region, infer the fine dust generation grade regarding how severe the generated fine dust is, correct the inferred fine dust generation grade through deep learning through an RNN, and determine the fine dust generation grade.

The RNN may be a neural network suitable for consecutive time-series data, such as a natural language, a voice signal, and a stock.

For example, the processor 120 may infer the fine dust generation grade as a numerical value of 0 to 10 and determine a correction result of the inferred numerical value in the RNN to be a final fine dust generation grade.

The processor 120 may infer a fine dust source by applying CAM to the inferred fine dust generation grade and visually display the source of fine dust on a map. In other words, the processor 120 may predict a cause of fine dust through CAM and visually display the predicted cause.

The CAM may be mapping technology for identifying to which portion of an image a deep learning model, or the CNN, that is used to infer a fine dust generation grade refers by each class and performs classification.

For example, the processor 120 may infer, as the source of fine dust, natural sources, such as soil dust, salt from seawater, and pollen from plants, and artificial sources, such as emissions generated when fossil fuels, such as coal and petroleum, are burned in boilers or power plants, automobile exhaust fumes, blowing dust from construction sites or the like, raw materials in powder in factories, powdery ingredients in subsidiary material processes, and smoke from incineration plants, and may output and display the inferred source of fine dust in an image or a video.

The processor 120 may predict a fine dust concentration in the specific region by using the inferred fine dust generation grade and numerically display the predicted fine dust concentration. In other words, the processor 120 may predict an amount of the generated fine dust through the inferred fine dust generation grade in the specific region and display the predicted fine dust concentration.

For example, the processor 120 may predict the fine dust concentration in the region A, of which a fine dust generation grade is ‘grade 6’ (‘bad’), to be 150 kg/m' and output and display the predicted fine dust concentration.

In addition, the processor 120 may maintain a standard deviation between fine dust concentrations such that the standard deviation does not decrease even when a prediction time increases by using the fine dust generation grade without using a root mean square error (RMSE) loss function when predicting the fine dust concentration and by applying a weight to the predicted fine dust concentration.

To minimize a loss, a typical RNN-based training model using an RMSE as a loss function may calculate a standard deviation between prediction values less than a standard deviation of an actual concentration as a prediction time increases.

Accordingly, the processor 120 may not use the RMSE, predict a fine dust concentration by using a pre-inferred fine dust generation grade, correct a loss of a prediction time increased by a set weight, and calculate a standard deviation between fine dust concentrations that is the same as a standard deviation of an actual concentration with no decrease.

According to an embodiment of the present disclosure, a method of predicting a fine dust concentration and inferring a fine dust source by using local public data and a prediction and inference device may be provided to increase the prediction accuracy of a fine dust concentration by converging a CNN-based training result of image classification of fine dust generation situations and an RNN-based training result of fine dust concentration prediction.

In addition, according to the present disclosure, a guideline to preemptively implement an emergency high-concentration fine dust reduction measure by inferring a fine dust source from a training result of image classification of fine dust generation situations may be provided to policy officers such that an emergency reduction policy measure may be efficiently implemented.

Recently, particulate matter (PM) 10 and PM 2.5 concentrations have been widely used to measure air pollution, and prediction models using artificial neural networks have been generally adopted for environmental features, such as a wind speed, temperature, humidity, precipitation, cloud amount, and the like, that is, meteorological information, to predict a degree of air pollution.

However, there may be an issue with the prediction performance of the prediction models in that the accuracy of the prediction models decreases because a prediction value converges to an average concentration as a prediction time increases in the artificial neural networks, and relationships between the environment and sources of fine dust are complex.

Fine dust in one region may be caused by an external influx and various sources in that region. Therefore, a fine dust concentration may be affected by seasons, days, times, weather conditions, economic activities, and the like.

The prediction and inference device 100 may infer generation of fine dust and a generation grade of the generated fine dust by converting time-series data related to the fine dust into an image dataset and learning the converted image dataset in a CNN-based image classification model.

In addition, the prediction and inference device 100 may increase the accuracy of a fine dust concentration by applying the inferred fine dust generation grade to training result correction of an RNN model to which the time-series data is applied.

In addition, the prediction and inference device 100 may infer a source of the fine dust by applying CAM to an image training result for fine dust grade classification.

In other words, the prediction and inference device 100 may predict/infer the generation of fine dust, the fine dust concentration, the fine dust generation grade, and the source of fine dust in a specific region by converging various training models and performing deep learning.

Figure 2:
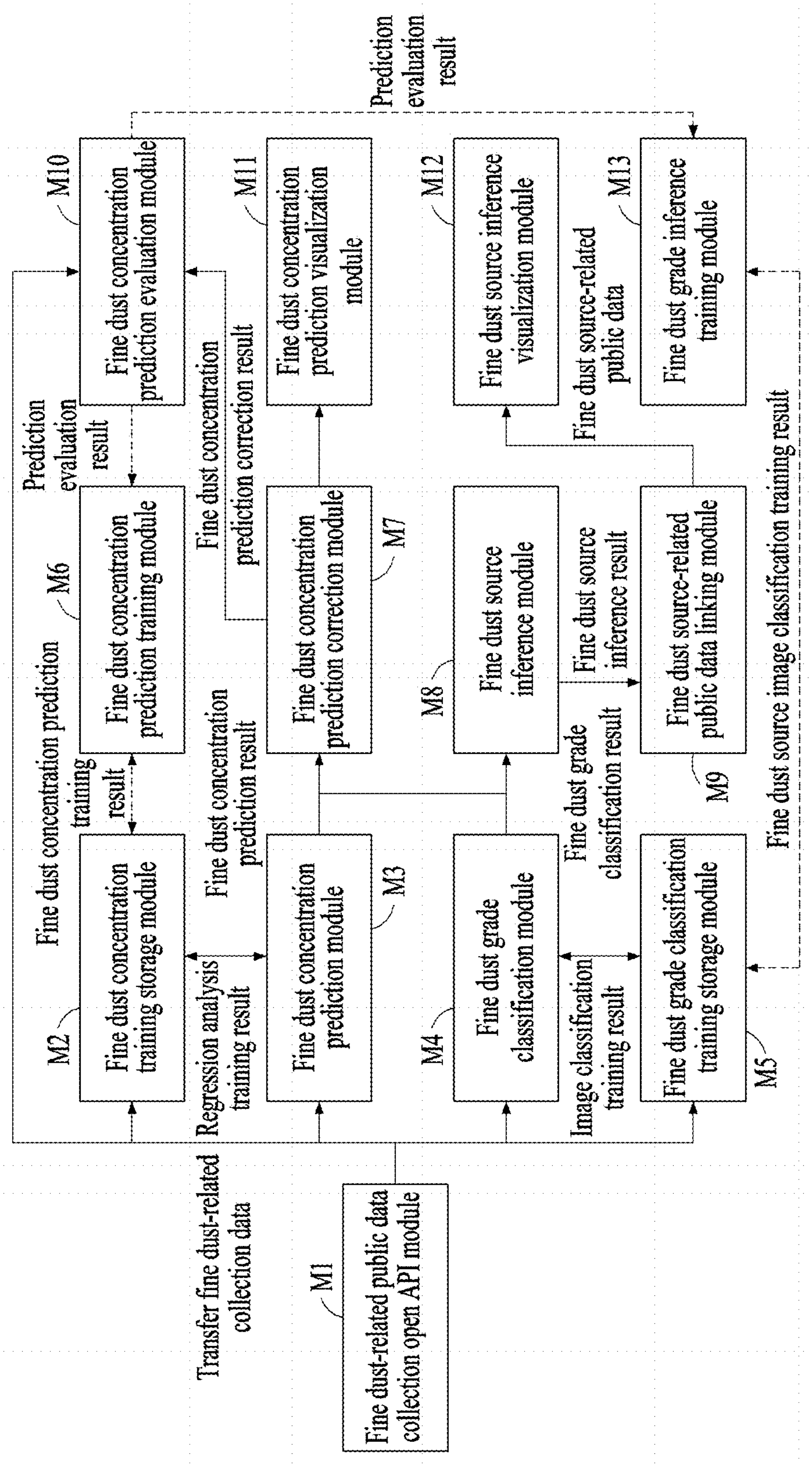
FIG. 2 is a diagram illustrating a configuration of a system for predicting, based on training, a fine dust concentration and inferring a fine dust source, according to a desirable embodiment.

FIG. 2 is a diagram illustrating a configuration of a system for predicting, based on training, a fine dust concentration and inferring a fine dust source, according to a desirable embodiment.

As illustrated in FIG. 2, the prediction and inference device 100 of the present disclosure may include a fine dust-related public data collection open API module M1, a fine dust concentration training storage module M2, a fine dust concentration prediction module M3, a fine dust grade classification module M4, a fine dust grade classification training storage module M5, a fine dust concentration prediction training module M6, a fine dust concentration prediction correction module M7, a fine dust source inference module M8, a fine dust source-related public data linking module M9, a fine dust concentration prediction evaluation module M10, a fine dust concentration prediction visualization module M11, a fine dust source inference visualization module M12, and a fine dust grade inference training module M13.

The fine dust-related public data collection open API module M1 may collect public data for predicting a fine dust concentration and inferring a fine dust source. The fine dust-related public data collection open API module M1 may collect the public data in a predetermined time unit (e.g., every minute).

The fine dust concentration training storage module M2 may store time-series data related to fine dust and an RNN-based training result of which a training dataset is the time-series data related to fine dust. The fine dust concentration training storage module M2 may store a training result (e.g., a fine dust concentration) in the fine dust concentration prediction module M3.

The fine dust concentration prediction module M3 may predict the fine dust concentration by using the time-series data related to fine dust collected in real time. The fine dust concentration prediction module M3 may set a pair of public data collected in consecutive times to a training dataset and predict and output the fine dust concentration through an RNN-based training result obtained by learning the training dataset.

The fine dust grade classification module M4 may classify grades of fine dust through image classification of fine dust situations. The fine dust grade classification module M4 may analyze images of collected public data and classify grades of a degree of generated fine dust.

The fine dust grade classification training storage module M5 may store a fine dust situation image training dataset and a fine dust grade classification training result. The fine dust grade classification training storage module M5 may store a training result (e.g., a fine dust grade) in the fine dust grade classification module M4.

The fine dust concentration prediction training module M6 may predict the fine dust concentration by applying the time-series data related to fine dust to the RNN-based training model. The fine dust concentration prediction training module M6 may perform deep learning by receiving a prestored training data from the fine dust to concentration training storage module M2 and predict a fine dust concentration in a specific region through the deep learning.

The fine dust concentration prediction correction module M7 may correct a prediction value of time-series data by using a fine dust concentration prediction result and a fine dust grade classification result. The fine dust concentration prediction correction module M7 may correct the fine dust concentration in the specific region predicted by the fine dust concentration prediction training module M6 such that the fine dust concentration may be more accurately predicted.

The fine dust source inference module M8 may infer a fine dust source by using the fine dust grade classification result. The fine dust source inference module M8 may infer a cause of fine dust by using the fine dust grade classified by the fine dust grade classification module M4. Sources of fine dust may be divided into natural sources and artificial sources. The natural sources may be soil dust, salt from seawater, pollen from plants, and the like. The artificial sources may be emissions generated when fossil fuels, such as coal and petroleum, are burned in boilers or power plants, automobile exhaust fumes, blowing dust from construction sites or the like, raw materials in powder in factories, powdery ingredients in subsidiary material processes, smoke from incineration plants, and the like.

The fine dust source-related public data linking module M9 may link public data related to a fine dust source inference result.

The fine dust concentration prediction evaluation module M10 may evaluate the accuracy of a corrected fine dust concentration prediction result.

The fine dust concentration prediction visualization module M11 may visualize the fine dust concentration prediction result.

The fine dust source inference visualization module M12 may visualize a fine dust source inference result and public data linked data.

The fine dust grade inference training module M13 may perform fine dust grade inference training by using an image training dataset for fine dust grade classification.

Figure 3:
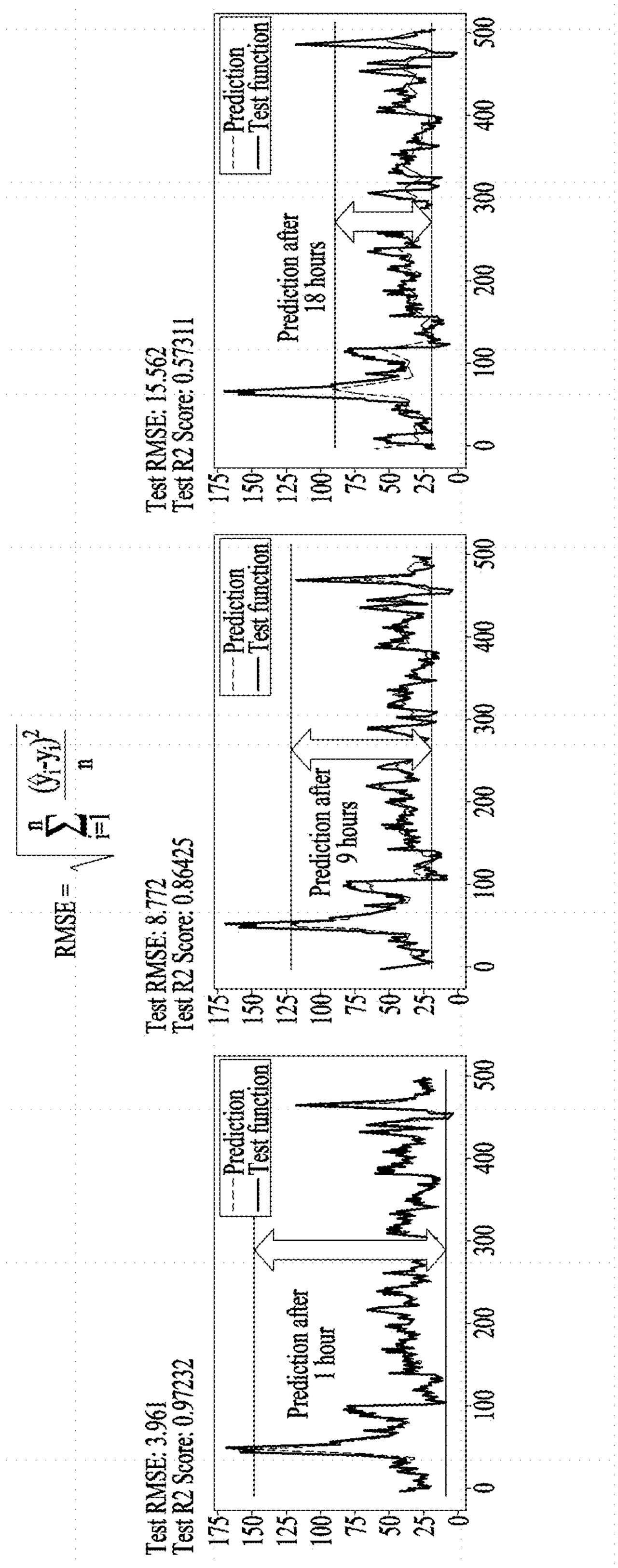
FIG. 3 is a diagram illustrating a decrease in a standard deviation of prediction results due to the use of a root mean square error (RMSE) loss function.

FIG. 3 is a diagram illustrating a decrease in a standard deviation of prediction results due to the use of an RMSE loss function.

FIG. 3 illustrates a decrease of prediction accuracy as a prediction value converges to a fine dust concentration average as a prediction time increases when predicting a fine dust concentration by using time-series data in the fine dust concentration prediction training module M6 of FIG. 2.

FIG. 3 illustrates a decrease of the prediction accuracy of the fine dust concentration as the prediction value decreases from 150 to 125 and to 100 and converges to the fine dust concentration average as the prediction time of the fine dust concentration increases from 1 hour to 9 hours and to 18 hours.

Because an RNN-based training model uses an RMSE as a loss function, to minimize a loss, a standard deviation between prediction values may be calculated less than a standard deviation of an actual concentration.

The use of the loss function may decrease the accuracy of the training-based prediction of the fine dust concentration.

To compensate the decrease of the fine dust concentration prediction accuracy, the fine dust concentration prediction correction module M7 of FIG. 2 may use an image classification training result stored in the fine dust grade classification training storage module M5 of FIG. 2.

Figure 4:
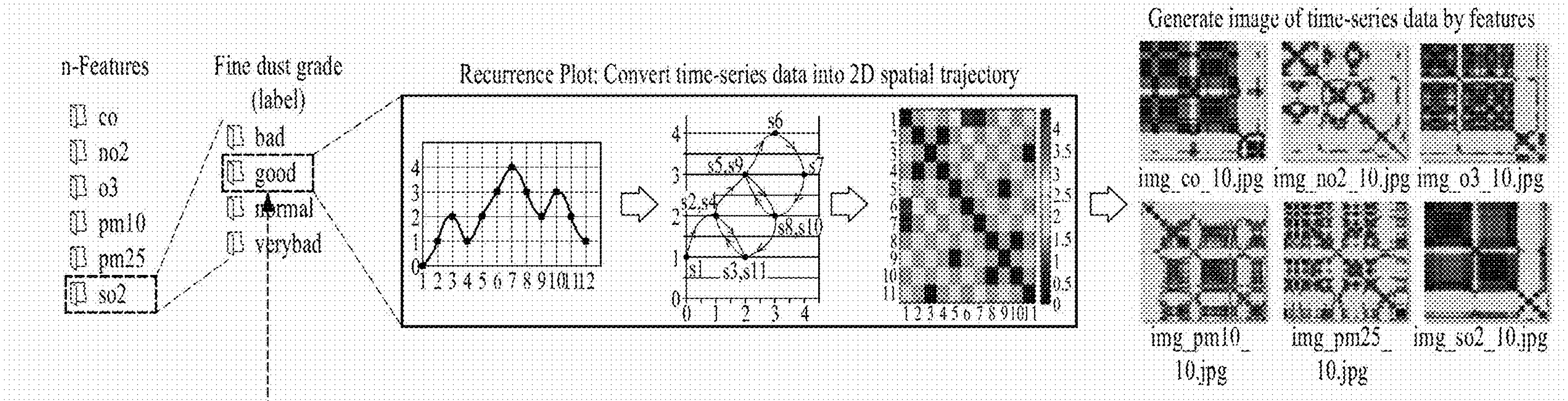
FIG. 4 is a diagram illustrating image generation of each fine dust feature by using time-series data.

FIG. 4 is a diagram illustrating image generation of each fine dust feature by using time-series data.

FIG. 4 illustrates a process of generating an image training dataset by each fine dust grade by using the time-series data.

The fine dust grade classification module M4 of FIG. 2 may select a feature of time-series data by each fine dust feature and set lag hours to generate an image for fine dust grade classification.

Referring to FIG. 4, the fine dust grade classification module M4 may generate an image by selecting a future time to be predicted as 3 hours from now while setting the lag hours to be 6 hours. A label generated in this case may be a fine dust concentration grade after the selected future time.

The fine dust grade classification module M4 may use a recurrence plot, a Markov transition field, a Gramian angular field, and the like, to convert the time-series data into a 2-dimensional (2D) spatial trajectory.

Figure 5:
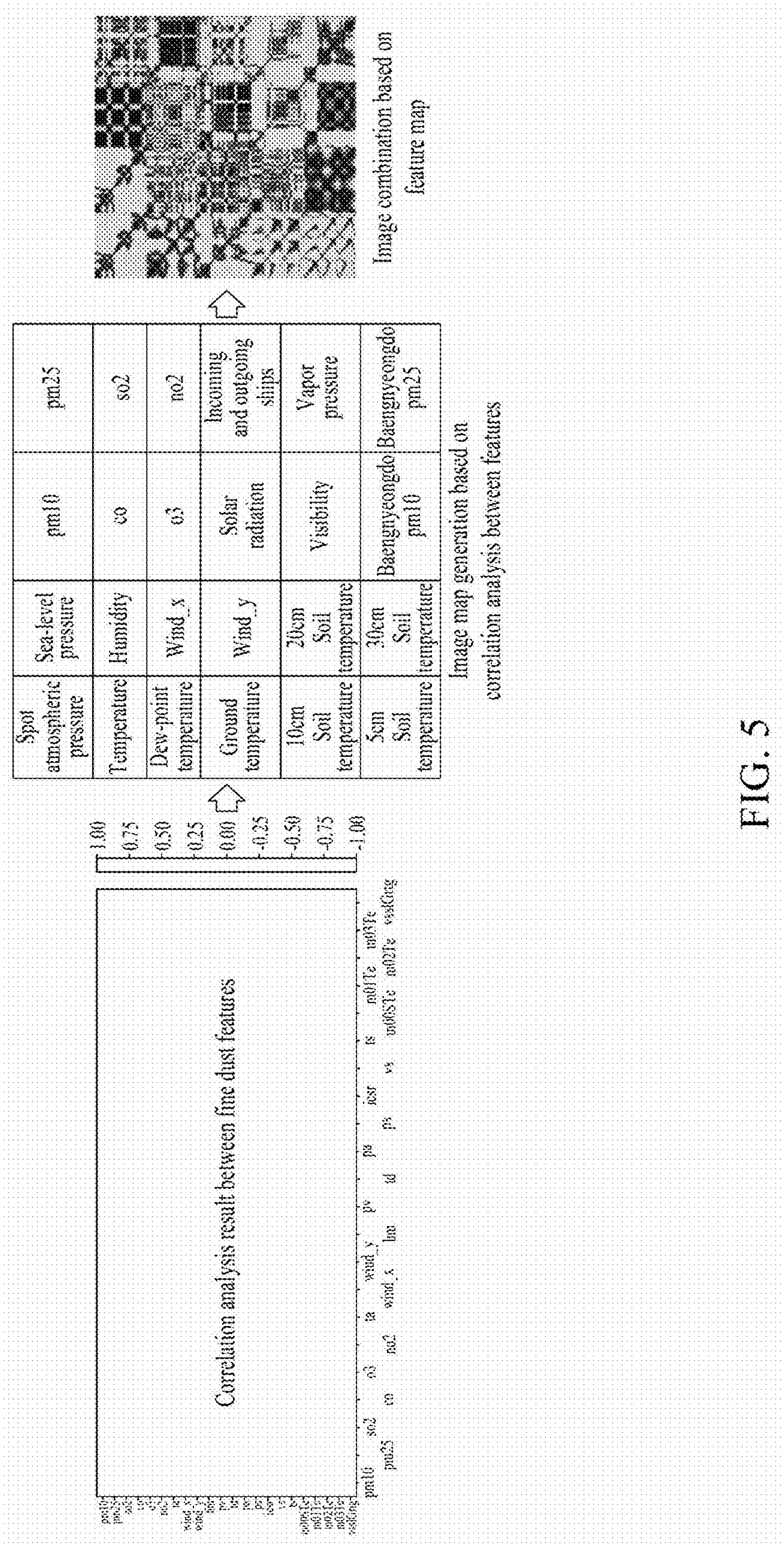
FIG. 5 is a diagram illustrating a combination of grade classification training images based on a fine dust feature map.

FIG. 5 is a diagram illustrating a combination of grade classification training images based on a fine dust feature map.

FIG. 5 illustrates a process of combining time-series images generated by each feature, based on a feature map, by the fine dust grade classification training storage module M5 of FIG. 2.

The fine dust grade classification training storage module M5 may analyze a correlation between fine dust features for image combination and generate a fine dust grade classification training image dataset based on the feature map by arranging features that are highly correlated to one another such that the features may be adjacent to one another.

The fine dust grade inference training module M13 of FIG. 2 may learn fine dust grade inference by using a combined image training dataset and a CNN (Visual Geometry Group (VGG) 16, EfficientNet, etc.)-based image classification model and store a result thereof in the fine dust grade classification training storage module M5.

Figure 6:
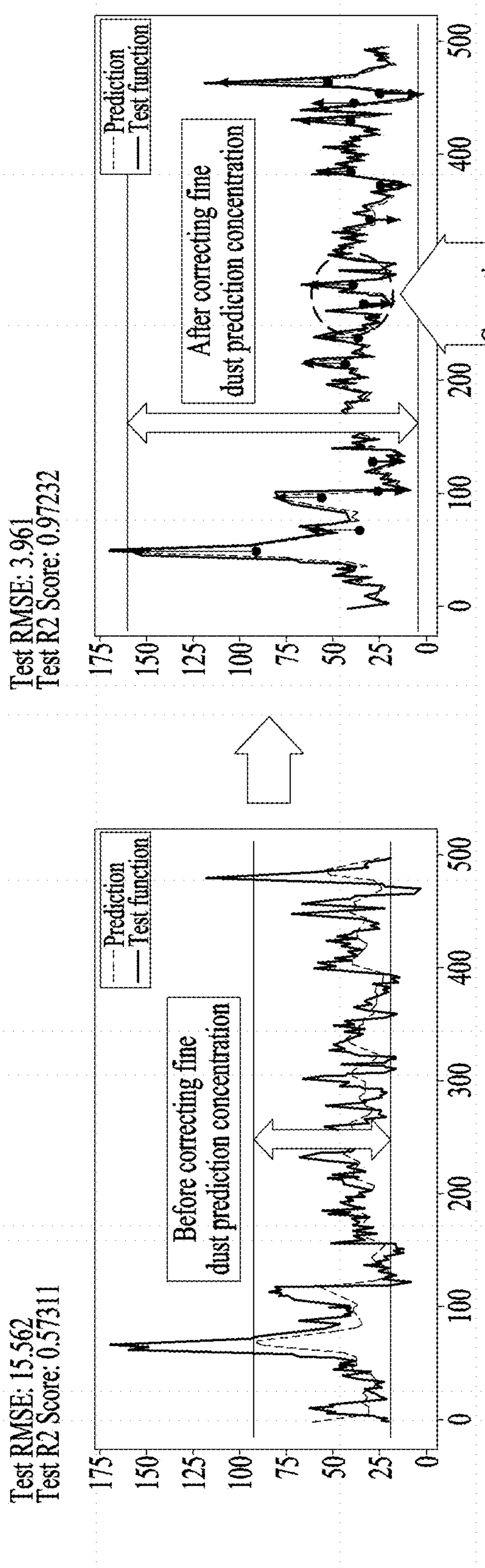
FIG. 6 is a diagram illustrating a method of increasing the prediction accuracy of a fine dust concentration by using an inference result of a fine dust grade.
Figure 6:
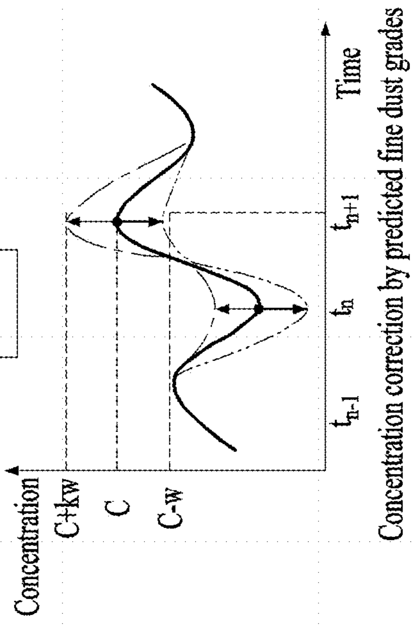

FIG. 6 is a diagram illustrating a method of increasing the prediction accuracy of a fine dust concentration by using a fine dust grade inference result.

FIG. 6 illustrates a process of increasing the fine dust concentration prediction accuracy by using a fine dust grade inference result in the fine dust concentration prediction correction module M7 of FIG. 2.

The fine dust concentration prediction correction module M7 may maintain a standard deviation between time-series data prediction results by using a fine dust grade inference prediction result, in an RNN-based prediction model, to solve an issue of a prediction result decreasing as a prediction time increases.

The fine dust concentration prediction correction module M7 may maintain the standard deviation by applying a weight to a fine dust concentration predicted according to the fine dust grade inference result at a prediction time and correcting the predicted fine dust concentration.

Referring to FIG. 6, weights '-w', '0', '+w', and '2*w*' may be respectively set to dust concentrations 'good', 'normal', 'bad', and 'very bad', a concentration by each predicted fine dust grade may be corrected by applying the set weight. Accordingly, a prediction value of the fine dust concentration may not converge to an average even when a prediction time increases and may be displayed as 155.

Figure 7:
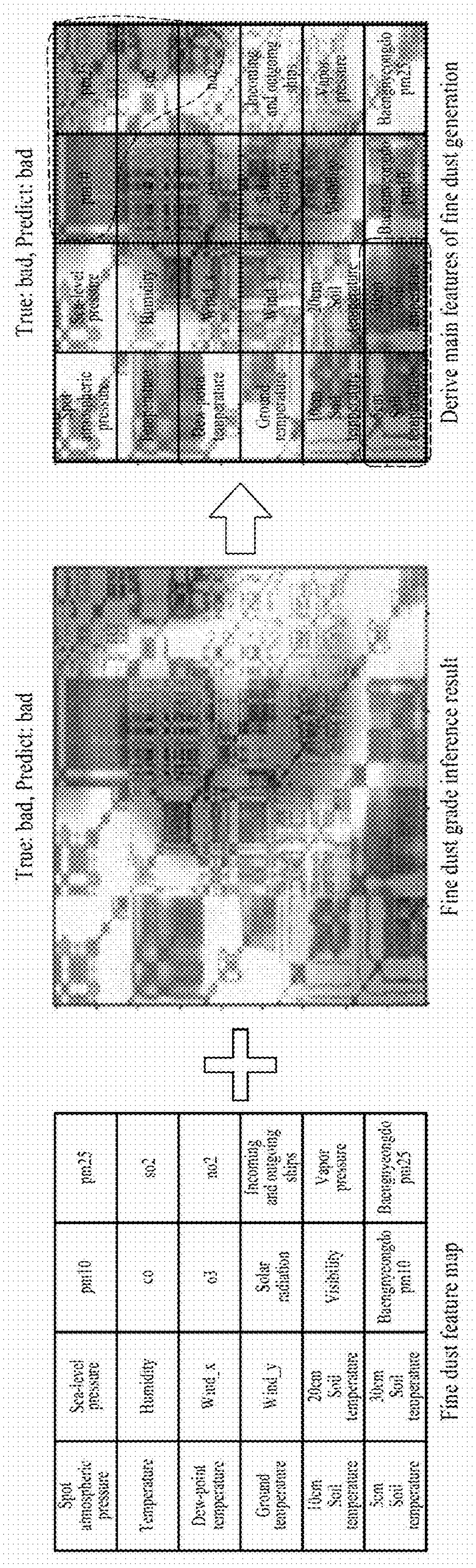
FIG. 7 is a diagram illustrating deriving of main generation features by using a fine dust feature map and a grade inference result.

FIG. 7 is a diagram illustrating deriving of main generation features by using a fine dust feature map and a grade inference result.

Referring to FIG. 7, by applying the fine dust feature map and a CAM technique to a fine dust grade inference result by the fine dust source inference module M8 of FIG. 2, when a fine dust grade is inferred as bad, the reason why the fine dust grade is inferred as bad may be verified through CAM, and by overlaying the fine dust feature map thereto, the main generation features may be derived.

FIG. 7 illustrates the deriving of the main features of fine dust generation by combining the fine dust feature map and the fine dust grade inference result. For example, 'spot atmospheric pressure' of coordinates (1,1) of the fine dust feature map may be combined with a fine dust grade inference result corresponding to the coordinates, and the main features of fine dust generation may be displayed as text (e.g., the spot atmospheric pressure) and an image (e.g., a fine dust grade image).

Figure 8:
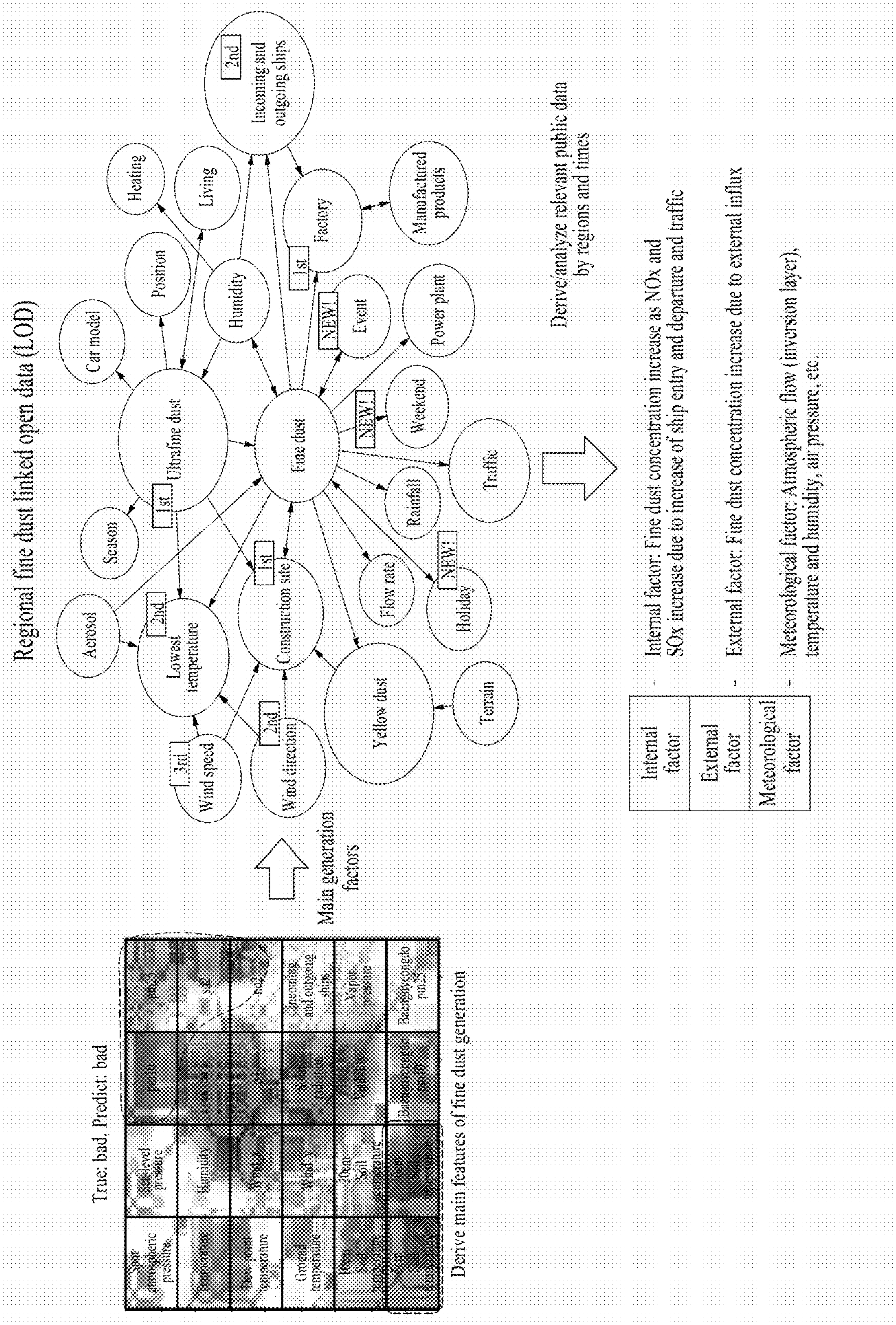
FIG. 8 is a diagram illustrating a process of supporting the decision making of policy officers by linking public data related to a fine dust source.

FIG. 8 is a diagram illustrating a process of supporting the decision making of policy officers by linking public data related to a fine dust source.

FIG. 8 illustrates a process of determining a main factor by linking the public data related to a fine dust source by regions and times in the fine dust source-related public data linking module M9 of FIG. 2.

Based on a result of deriving the main features of fine dust generation through the fine dust source inference module M8 of FIG. 2, the fine dust source-related public data linking module M9 may derive an internal factor, an external factor, and a meteorological factor with respect to a main source of fine dust as a public data analysis result of linked open data (LOD) on fine dust by regions related to the derived main features.

FIG. 8 illustrates an example of finding a main generation factor from the main features of fine dust generation of FIG. 7, establishing regional fine dust LOD, deriving and analyzing related public data by regions and times through the established regional fine dust LOD, and deriving the internal, external, and meteorological factors of fine dust generation.

The internal factor may include, for example, an increase of a fine dust concentration as NOx and SOx increase due to an increase of the entry and departure of ships and traffic.

The external factor may include, for example, an increase of a fine dust concentration due to an external influx.

The meteorological factor may include, for example, atmospheric flow (e.g., an inversion layer), temperature and humidity, air pressure, and the like.

Figure 9A:
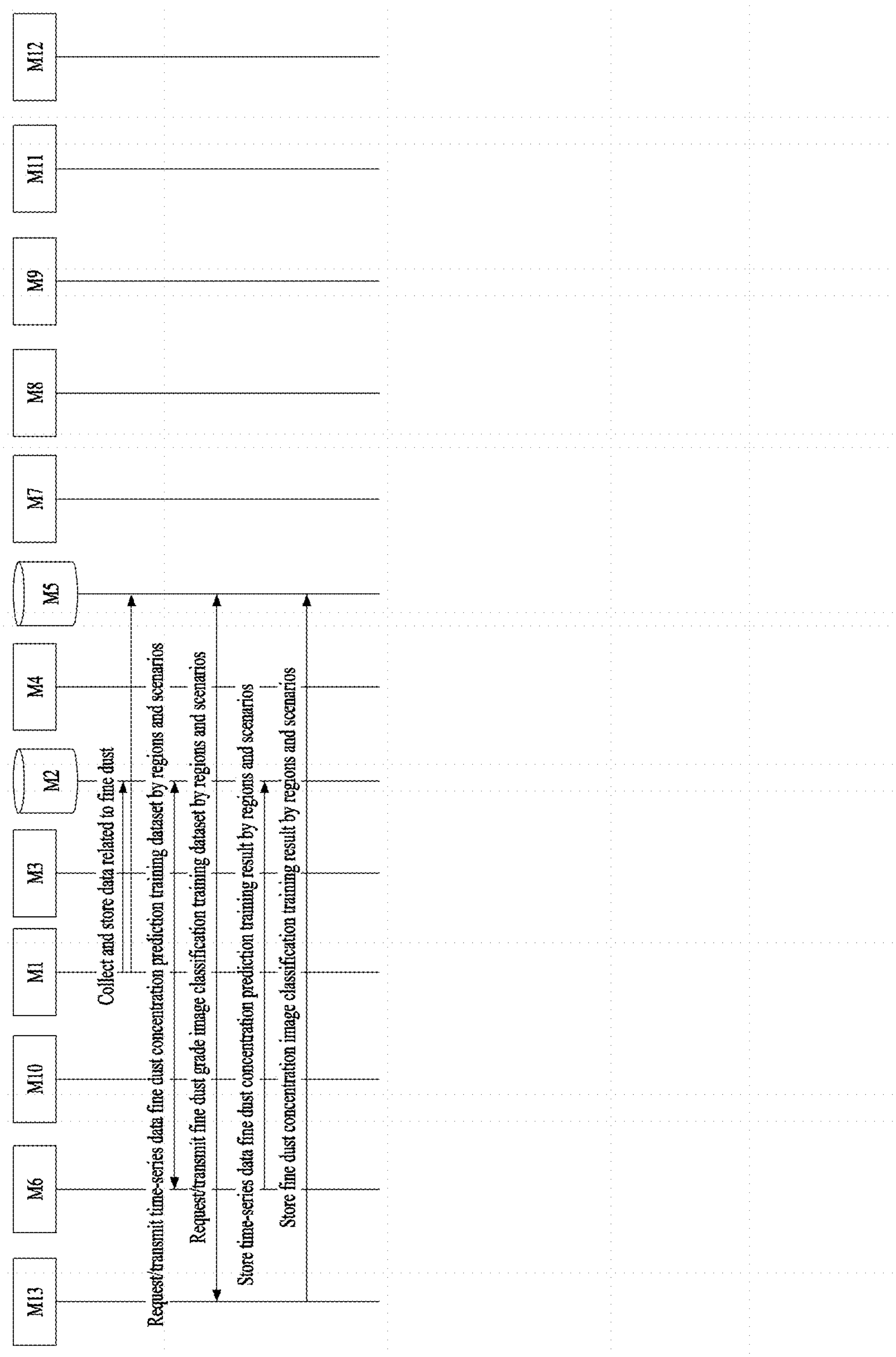
FIGS. 9A, 9B, and 9C are diagrams each illustrating an operation procedure of predicting a fine dust concentration and inferring a fine dust source.
Figure 9B:
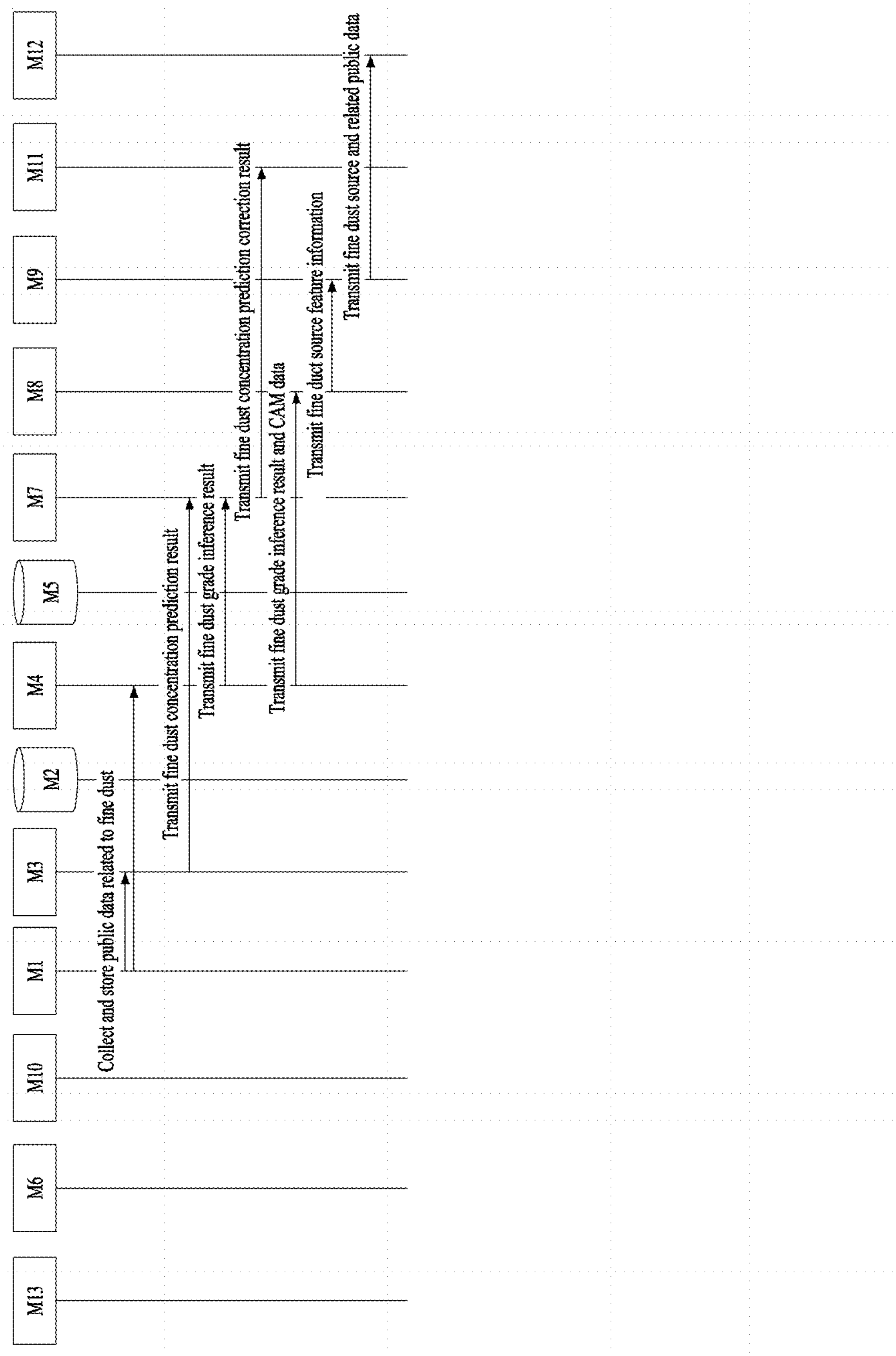
Figure 9C:
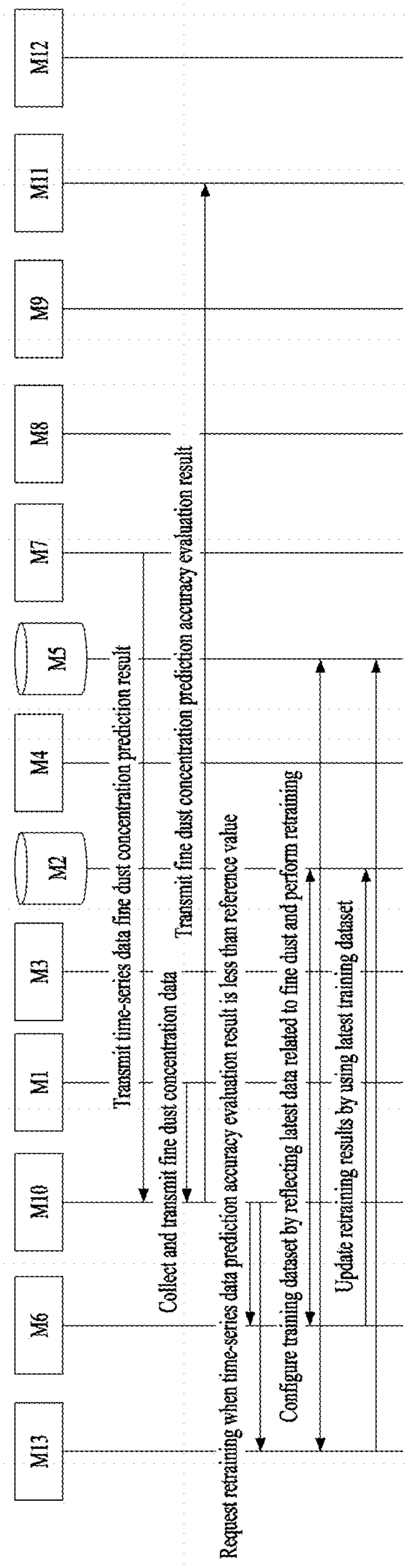

FIGS. 9A, 9B, and 9C are diagrams each illustrating an operation procedure of predicting a fine dust concentration and inferring a fine dust source.

FIGS. 9A, 9B, and 9C illustrate examples of the operation procedure of training-based fine dust concentration prediction and fine dust source inference.

The prediction and inference device 100 of the present disclosure may operate by being mainly divided into a training operation of FIG. 9A, a prediction/inference operation of FIG. 9B, and a retraining operation of FIG. 9C.

In the training operation of FIG. 9A, a fine dust-related public data collection open API module M1 may collect pieces of data related to fine dust that are necessary for training and store the collected pieces of data respectively in a fine dust concentration training storage module M2 and a fine dust grade classification training storage module M5.

A fine dust concentration prediction training module M6 may configure a fine dust concentration prediction training dataset including time-series data stored in the fine dust concentration training storage module M2 by regions and scenarios, perform fine dust concentration prediction training by using an RNN-based training model, and store a result of the fine dust concentration prediction training in the fine dust concentration training storage module M2.

A fine dust grade inference training module M13 may perform fine dust concentration image classification training by regions and scenarios by using a fine dust grade classification training image stored in the fine dust grade classification training storage module M5 and store a result of the fine dust concentration image classification training in the fine dust grade classification training storage module M5.

In the prediction/inference operation of FIG. 9B, a fine dust concentration prediction module M3 may receive public data related to fine dust from the fine dust-related public data collection open API module M1 and transmit a prediction result obtained by applying a time-series training result to the received public data to a fine dust concentration prediction correction module M7.

In addition, a fine dust grade classification module M4 may transmit, to the fine dust concentration prediction correction module M7, a fine dust grade inference result by converting time-series data received from the fine dust-related public data collection open API module M1 into an image.

The fine dust concentration prediction correction module M7 may correct the fine dust concentration prediction result by using the fine dust grade inference result and transmit a result of the correction to a fine dust concentration prediction visualization module M11 to visualize the result.

The fine dust grade classification module M4 may transmit the fine dust grade inference result and CAM data to a fine dust source inference module M8.

The fine dust source inference module M8 may infer a fine dust main factor by using a fine dust feature map and the CAM data and transmit source feature information to a fine dust source-related public data linking module M9.

The fine dust source-related public data linking module M9 may derive an internal factor, an external factor, and a meteorological factor with respect to a main source of fine dust as a public data analysis result of LOD on fine dust by regions and transmit a derived result to a fine dust source inference visualization module M12 to visualize the derived result.

In the evaluation and retraining operation of FIG. 9C, the fine dust concentration prediction correction module M7 may transmit a time-series fine dust concentration prediction result to a fine dust concentration prediction evaluation module M10 for prediction model evaluation.

The fine dust concentration prediction evaluation module M10 may receive actual fine dust concentration data at a fine dust concentration prediction time from the fine dust-related public data collection open API module M1, calculate fine dust concentration prediction accuracy ($R^2$ Score: the coefficient of determination), and transmit a calculated result to the fine dust concentration prediction visualization module M11 to visualize the calculated result.

When the time-series data prediction accuracy evaluation is less than a reference value, retraining may be requested of the fine dust concentration prediction training module M6 and the fine dust grade inference training module M13.

The fine dust concentration prediction training module M6 and the fine dust grade inference training module M13 may perform the retraining after configuring a training dataset by reflecting the latest data related to the fine dust and update the respective retraining results thereof.

Through the above procedure, the prediction and inference device 100 may perform prediction and fine dust source inference with a certain level of accuracy despite an environmental change when inferring a fine dust concentration.

When a high-concentration fine dust is generated, policy officers may need to implement emergency reduction measures. According to the present disclosure, a guideline on when and which emergency reduction measures are needed to be performed may be established, and a policy of emergency reduction measures may be efficiently implemented based on the guideline.

Hereinafter, an operation flow of the prediction and inference device 100 according to embodiments is described in detail with reference to FIG. 10.

Figure 10:
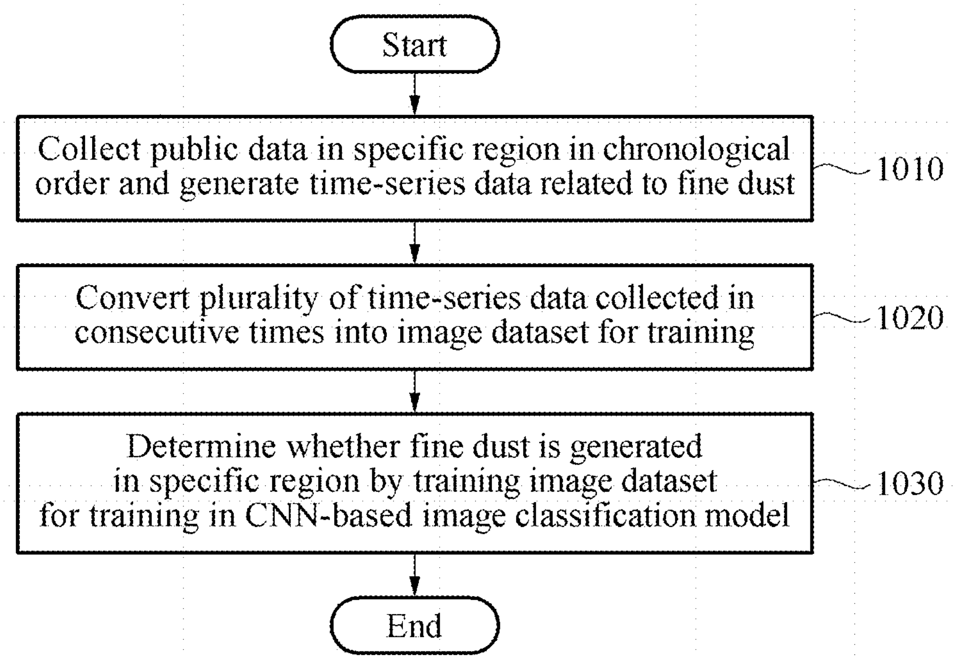
FIG. 10 is a flowchart illustrating a method of predicting a fine dust concentration and a fine dust source by using local public data, according to an embodiment.

FIG. 10 is a flowchart illustrating a method of predicting a fine dust concentration and a fine dust source by using local public data, according to an embodiment.

The method of predicting the fine dust concentration and the source of fine dust by using the local public data may be performed by the prediction and inference device 100.

First, in operation 1010, the prediction and inference device 100 may collect public data in a specific region in a chronological order and generate time-series data related to the fine dust. Operation 1010 may be a process of generating consecutive pieces of time-series data by retrieving public data sensed in a time unit (e.g., an interval of 1 second, 10 minutes, or 1 hour), for example, by a sensor in a specific region, that is, an observation target with respect to fine dust generation.

In this case, the public data may be data, such as an aerial image capturing the specific region, and temperature, ozone, dust, air quality, etc. in the specific region that is sensed for a purpose of public interest and disclosed to the public through an open API of a public data portal.

In addition, in operation 1020, the prediction and inference device 100 may convert pieces of time-series data collected in consecutive times into an image dataset for training. Operation 1020 may be a process of converting time-series data related to fine dust collected for a certain time into an image dataset and enable the image dataset to be trained in a CNN, that is, a training model.

For example, the prediction and inference device 100 may convert three pieces of ozone level data collected in 1-minute intervals in a region A into three image datasets by combining the three pieces of ozone level data with map data of the region A.

Subsequently, in operation 1030, the prediction and inference device 100 may determine whether fine dust is generated in the specific region by training the image dataset for training in a CNN-based image classification model. Operation 1030 may be a process of determining whether fine dust is generated in the specific region by inputting a converted image dataset to the CNN and performing deep learning.

The CNN may be an algorithm useful for finding a pattern for analyzing an image dataset, that is, a neural network for directly learning the image dataset and classifying the image dataset by using the pattern.

Based on the determining of whether fine dust is generated in the specific region, the prediction and inference device 100 may infer a fine dust generation grade of the generated fine dust and correct the inferred fine dust generation grade through a training result of an RNN model. In other words, the prediction and inference device 100 may verify that fine dust is generated in the specific region, infer the fine dust generation grade regarding how severe the generated fine dust is, correct the inferred fine dust generation grade through deep learning through an RNN, and determine the fine dust generation grade.

The RNN may be a neural network suitable for consecutive time-series data, such as a natural language, a voice signal, and a stock.

For example, the prediction and inference model 100 may infer the fine dust generation grade as a numerical value of 0 to 10 and determine a correction result of the inferred numerical value in the RNN to be a final fine dust generation grade.

The prediction and inference model 100 may infer a fine dust source by applying CAM to the inferred fine dust generation grade and visually display the source of fine dust on a map. In other words, the prediction and inference model 100 may predict a cause of fine dust through CAM and visually display the predicted cause.

The CAM may be mapping technology for identifying to which portion of an image a deep learning model, or the CNN, that is used to infer a fine dust generation grade refers by each class and performs classification.

For example, the prediction and inference model 100 may infer, as the source of fine dust, natural sources, such as soil dust, salt from seawater, and pollen from plants, and artificial sources, such as emissions generated when fossil fuels, such as coal and petroleum, are burned in boilers or power plants, automobile exhaust fumes, blowing dust from construction sites or the like, raw materials in powder in factories, powdery ingredients in subsidiary material processes, and smoke from incineration plants, and may output and display the inferred source of fine dust in an image or a video.

The prediction and inference model 100 may predict a fine dust concentration in the specific region by using the inferred fine dust generation grade and numerically display the predicted fine dust concentration. In other words, the prediction and inference model 100 may predict an amount of the generated fine dust through the inferred fine dust generation grade in the specific region and display the predicted fine dust concentration.

For example, the prediction and inference model 100 may predict the fine dust concentration in the region A, of which a fine dust generation grade is 'grade 6' ('bad'), to be 150 $\mu g/m^3$ and output and display the predicted fine dust concentration. In addition, the prediction and inference model 100 may maintain a standard deviation between fine dust concentrations such that the standard deviation does not decrease even when a prediction time increases by using the fine dust generation grade without using an RMSE loss function when predicting the fine dust concentration and by applying a weight to the predicted fine dust concentration.

To minimize a loss, a typical RNN-based training model using an RMSE as a loss function may calculate a standard deviation between prediction values less than a standard deviation of an actual concentration as a prediction time increases.

Accordingly, the prediction and inference model 100 may not use the RMSE, predict a fine dust concentration by using a pre-inferred fine dust generation grade, correct a loss of a prediction time increased by a set weight, and calculate a standard deviation between fine dust concentrations that is the same as a standard deviation of an actual concentration with no decrease.

According to an embodiment of the present disclosure, a method of predicting a fine dust concentration and inferring a fine dust source by using local public data and a prediction and inference device may be provided to increase the prediction accuracy of a fine dust concentration by converging a CNN-based training result of image classification of fine dust generation situations and an RNN-based training result of fine dust concentration prediction.

In addition, according to the present disclosure, a guideline to preemptively implement an emergency high-concentration fine dust reduction measure by inferring a fine dust source from a training result of image classification of fine dust generation situations may be provided to policy officers such that an emergency reduction policy measure may be efficiently implemented.

The examples described herein may be implemented by using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of predicting a fine dust concentration and inferring a fine dust source by using local public data, the method comprising:

generating time-series data related to fine dust by collecting public data in a specific region in a predetermined chronological order; and determining whether fine dust is generated in the specific region by converting pieces of time-series data collected in consecutive times into an image dataset for training and by training the image dataset for training in a convolution neural network (CNN)-based image classification model;

based on the determining of whether fine dust is generated in the specific region, inferring a fine dust generation grade of the generated fine dust; and correcting the inferred fine dust generation grade through a training result of a recurrent neural network (RNN) model.

2. The method of claim 1, further comprising:

inferring a source of the fine dust by applying class activation mapping (CAM) to the inferred fine dust generation grade; and visually displaying the source of the fine dust on a map.

3. The method of claim 1, further comprising:

predicting a fine dust concentration in the specific region by using the inferred fine dust generation grade; and numerically displaying the predicted fine dust concentration.

4. The method of claim 3, further comprising:

maintaining a standard deviation between fine dust concentrations such that the standard deviation does not decrease even when a prediction time increases by using the fine dust generation grade without using a root mean square error (RMSE) loss function when predicting the fine dust concentration and by applying a weight to the predicted fine dust concentration.

5. A non-transitory computer-readable storage medium storing instructions that, when executed by a processor, cause the processor to perform the method of claim 1.

6. A prediction and inference device by using local public data, the device comprising:

an interface configured to generate time-series data related to fine dust by collecting public data in a specific region in a predetermined chronological order; and a processor configured to determine whether fine dust is generated in the specific region by converting pieces of time-series data collected in consecutive times into an image dataset for training and by training the image dataset for training in a CNN-based image classification model, wherein the processor is configured to, based on the determining of whether fine dust is generated in the specific region, infer a fine dust generation grade of the generated fine dust and correct the inferred fine dust generation grade through a training result of an RNN model.

7. The device of claim 6, wherein the processor is configured to infer a source of the fine dust by applying CAM to the inferred fine dust generation grade and visually display the source of the fine dust on a map.

8. The device of claim 6, wherein the processor is configured to predict a fine dust concentration in the specific region by using the inferred fine dust generation grade and numerically display the predicted fine dust concentration.

9. The device of claim 8, wherein the processor is configured to maintain a standard deviation between fine dust concentrations such that the standard deviation does not decrease even when a prediction time increases by using the fine dust generation grade without using an RMSE loss function when predicting the fine dust concentration and by applying a weight to the predicted fine dust concentration.

* * * * *